United States Patent
Watanabe et al.

(10) Patent No.: US 7,920,051 B2
(45) Date of Patent: Apr. 5, 2011

(54) INFORMATION PROVIDING SYSTEM AND IMAGE FORMING APPARATUS

(75) Inventors: Masao Watanabe, Ashigarakami-gun (JP); Nobumi Kusano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 922 days.

(21) Appl. No.: 11/213,967

(22) Filed: Aug. 30, 2005

(65) Prior Publication Data
US 2006/0214775 A1 Sep. 28, 2006

(30) Foreign Application Priority Data
Mar. 24, 2005 (JP) ................................ 2005-087177

(51) Int. Cl.
*H04Q 5/22* (2006.01)
*G08B 5/22* (2006.01)

(52) U.S. Cl. ................... 340/10.41; 340/10.3; 340/10.1; 340/10.2

(58) Field of Classification Search ............... 340/10.41, 340/10.3, 10.1, 10.2, 5.86, 825.72, 572.9, 340/825.37, 572.1; 375/347; 342/457
See application file for complete search history.

(56) References Cited

U.S. PATENT DOCUMENTS

| | | | | |
|---|---|---|---|---|
| 3,978,731 A | * | 9/1976 | Reeder et al. | 73/703 |
| 5,300,875 A | * | 4/1994 | Tuttle | 320/138 |
| 5,446,452 A | * | 8/1995 | Litton | 340/870.17 |
| 5,687,196 A | * | 11/1997 | Proctor et al. | 375/347 |
| 5,691,698 A | * | 11/1997 | Scholl et al. | 340/572.5 |
| 5,745,049 A | * | 4/1998 | Akiyama et al. | 340/870.17 |
| 5,918,258 A | * | 6/1999 | Bowers | 73/24.06 |
| 5,929,770 A | * | 7/1999 | Faita | 340/10.41 |
| 6,144,332 A | * | 11/2000 | Reindl et al. | 342/42 |
| 6,555,766 B2 | * | 4/2003 | Breed et al. | 177/144 |
| 6,744,364 B2 | * | 6/2004 | Wathen | 340/539.1 |
| 6,747,545 B2 | * | 6/2004 | Nowottnick et al. | 340/5.61 |
| 6,774,764 B2 | * | 8/2004 | Ghosh et al. | 340/5.61 |
| 6,781,483 B2 | * | 8/2004 | Tanaka et al. | 333/193 |
| 6,788,199 B2 | * | 9/2004 | Crabtree et al. | 340/539.13 |
| 6,806,808 B1 | * | 10/2004 | Watters et al. | 340/10.41 |
| 7,019,618 B2 | * | 3/2006 | Pratt et al. | 340/10.2 |
| 7,140,261 B2 | * | 11/2006 | Liu et al. | 73/861.25 |
| 7,158,032 B2 | * | 1/2007 | Rodriguez et al. | 340/572.1 |
| 7,227,446 B2 | * | 6/2007 | Kumazaki et al. | 340/5.61 |
| 7,245,213 B1 | * | 7/2007 | Esterberg et al. | 340/539.12 |
| 7,362,226 B2 | * | 4/2008 | Koshimizu et al. | 340/566 |

FOREIGN PATENT DOCUMENTS

| | | | |
|---|---|---|---|
| JP | A 2002-83250 | | 3/2002 |
| JP | 2003319911 A | * | 11/2003 |
| JP | A 2004-362205 | | 12/2004 |

* cited by examiner

*Primary Examiner* — Brian A Zimmerman
*Assistant Examiner* — Nam V Nguyen
(74) *Attorney, Agent, or Firm* — Oliff & Berridge, PLC (57) ABSTRACT

The present invention provides information providing system including: a wireless sheet attached to an article; and an information notifying apparatus which notifies information on the article in response to a radio signal sent from the wireless sheet, wherein, the wireless sheet includes a wireless measuring unit which, when receiving a radio signal, generates and sends a radio signal having identification data and data of physical quantity measured in the wireless sheet, and the information notifying apparatus includes: a transmitter/receiver which exchanges radio signals with the wireless sheet; a storage unit which stores the identification data and the article information in association with each other; and a notifying unit which extracts from the received radio signal, the identification data and the physical quantity data, and reads the article information stored in association with the identification data in the storage unit, and notifies the article information and the physical quantity data.

14 Claims, 8 Drawing Sheets

| IDENTIFICATION DATA | INFORMATION MESSAGE |
|---|---|
| ... | ... |
| ... | ... |
| ... | ... |
| ... | ... |

INFORMATION PROVIDING SYSTEM AND IMAGE FORMING APPARATUS

This application claims priority under 35 U.S.C. §119 of Japanese Patent Application No. 2005-87177 filed on Mar. 24, 2005, the entire content of which is hereby incorporated by reference.

BACKGROUND OF THE INVENTION

1. Field of the Invention

The present invention relates to a wireless sheet attached to an article and an information providing system which uses the wireless sheet to provide information on the article.

2. Description of the Related Art

In recent years, a wireless IC tag (or card) which transmits radio signals to and receives radio signals from an external transmitter/receiver has come into use. The wireless IC tag has no power source, and reads or writes data in a memory of the tag in response to a radio signal sent from an external transmitter/receiver.

A number of techniques using the wireless IC tag have been developed. For example, Japanese Patent Application Laid-open Publication No. 2002-83250 discloses a technique of obtaining information on an article from identification data stored in a wireless IC tag read by a handheld reader having a transmitter/receiver. Japanese Patent Application Laid-open Publication No. 2004-362205 discloses a technique of obtaining information on an article from a database connected to a network, using identification data of the article read from a wireless IC tag.

When managing inventories or sorting deliveries using wireless IC tags, a handheld reader as disclosed in Japanese Patent Application Laid-open Publication No. 2002-83250 is commonly used. However, when an article is large, or when a user's hands are occupied, a handheld reader is difficult to operate.

Also, since a reader reads information by being brought close to a wireless IC tag, if there exist plural wireless IC tags within range of a radio signal sent from the reader, it is not possible to discern which wireless IC tag has been read by the reader.

The present invention has been made with a view to addressing the problem discussed above, and provides an information providing system in which an information notifying apparatus displays information needed by a user on its display in response to an information request command provided from a wireless sheet.

SUMMARY OF THE INVENTION

To address the problems discussed above, the present invention provides information providing system including: a wireless sheet attached to an article; and an information notifying apparatus which notifies information on the article in response to a radio signal sent from the wireless sheet, wherein, the wireless sheet includes a wireless measuring unit which, when receiving a radio signal, generates and sends a radio signal by using the received radio signal as an energy source, the sent radio signal having identification data and data of physical quantity measured in the wireless sheet, and the information notifying apparatus includes: a transmitter/receiver which exchanges radio signals with the wireless sheet; a storage unit which stores the identification data and the article information in association with each other; and a notifying unit which extracts from a radio signal received by the transmitter/receiver the identification data and the physical quantity data, and reads the article information stored in association with the identification data in the storage unit, and notifies the article information and the physical quantity data.

According to an embodiment of the present invention, an information request command can be provided from a wireless sheet to an information notifying apparatus. Accordingly, a user can request a notification of desired information on an article to the information notifying apparatus only by touching a wireless sheet, and obtain the information.

BRIEF DESCRIPTION OF THE DRAWINGS

Embodiments of the present invention will be described in detail with reference to the following figures, wherein.

DETAILED DESCRIPTION OF THE INVENTION

1. First Embodiment

The first embodiment of the present invention will be described.

Figure 1:
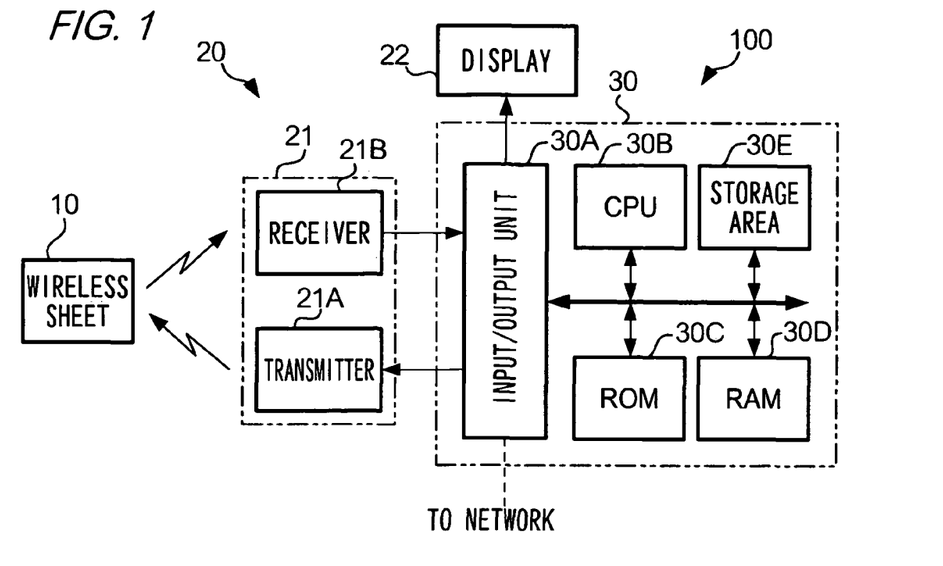
FIG. 1 is a diagram illustrating a configuration of an information providing system according to the first embodiment of the present invention.

FIG. 1 is a diagram illustrating a basic configuration of information providing system 100. Information providing system 100 includes wireless sheet 10 and information notifying apparatus 20. Information notifying apparatus 20 includes transmitter/receiver 21, display 22, and controller 30.

Figure 2:
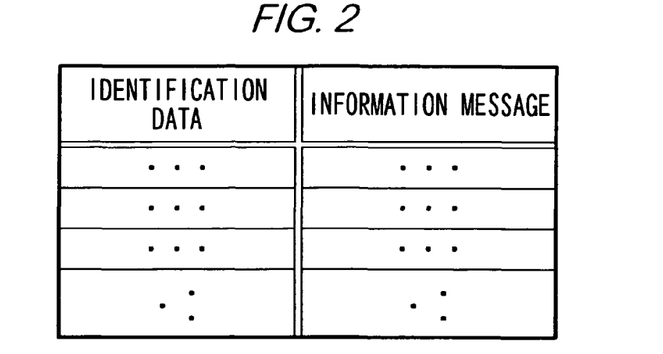
FIG. 2 is a diagram illustrating a data table used in the first embodiment.

Controller 30 includes: input/output unit 30A such as an interface; CPU (Central Processing Unit) 30B; ROM (Read Only Memory) 30C; RAM (Random Access Memory) 30D; and storage area 30E. ROM 30C stores a program for exchanging radio signals with wireless sheet 10 via transmitter/receiver 21 and displaying an information message D on display 22. RAM 30D is used as a work area when the program is executed. Storage area 30E stores an information table where message information D is associated with identification data as shown in FIG. 2.

Next, wireless sheet 10 used in the present embodiment will be described.

Figure 3:
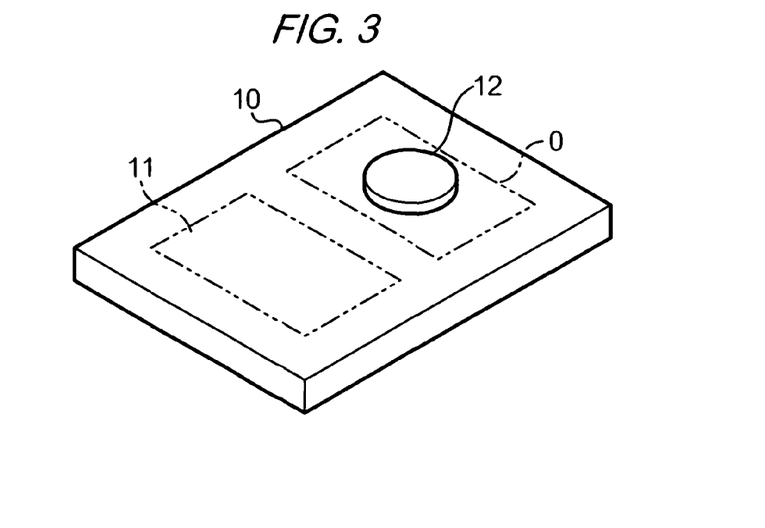
FIG. 3 is a perspective view illustrating an appearance of a wireless sheet used in the first embodiment.

As shown in FIG. 3, wireless sheet 10 includes IC tag 11 used for RFID (Radio Frequency Identification), wireless pressure sensor 0, and button 12.

IC tag 11 and wireless pressure sensor 0 are housed in a sheet-like package of resin, and button 12 is formed on the package integrally. When an external pressure is applied on button 12, button 12 transfers the pressure to pressure sensor 0.

IC tag 11 includes: e.g. a board; an IC chip having a capacitor built-in; an antenna formed on the board as a coiled conductive pattern (each of which is not shown). The antenna and the capacitor form a resonance circuit, and if a radio signal having a predetermined frequency is received, IC tag 11 sends identification data pre-stored in the IC chip. Specifically, IC tag 11 according to the present embodiment, if receiving an ID interrogation signal (e.g. a signal having the frequency of 125 kHz or 2.45 GHz), sends identification data stored in the IC chip as an ID response signal.

Next, a configuration and a basic operation of pressure sensor 0 will be described.

First, a configuration of pressure sensor 0 used in the present embodiment will be described with reference to FIG. 4.

Figure 4A:
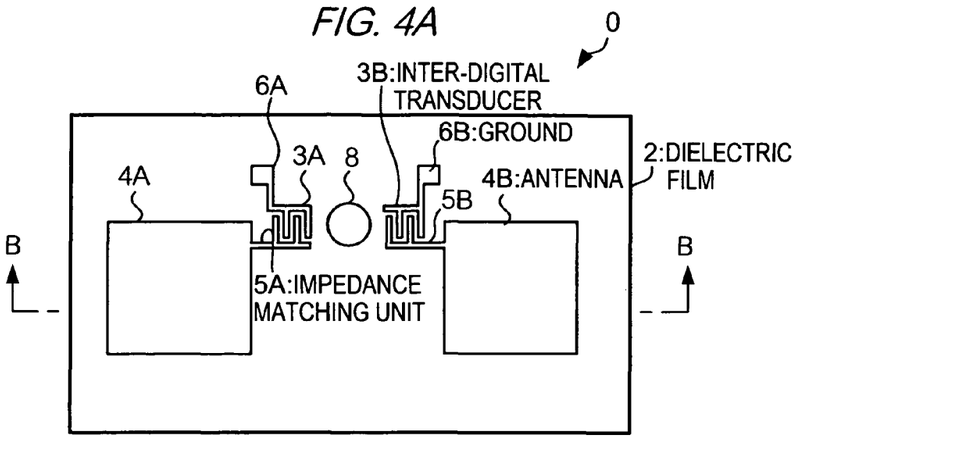
FIG. 4 is a diagram illustrating a structure of a wireless pressure sensor used in the first embodiment.
Figure 4B:
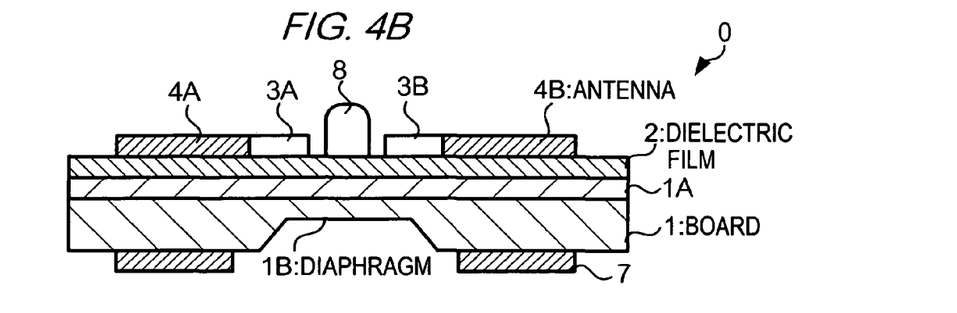

FIG. 4 is a diagram illustrating a configuration of pressure sensor 0 according to the present embodiment. Pressure sensor 0 includes: Si board 1 which is a base; dielectric film 2 which is formed on Si board 1 via oxide film 1A and on which a surface acoustic wave is propagated; a pair of inter-digital transducers 3A and 3B which are formed on dielectric film 2 and convert an electrical signal to a surface acoustic wave, or vice versa; antennas 4A and 4B which are connected to an end of inter-digital transducers 3A and 3B via impedance matching units 5A and 5B respectively, and exchange a radio signal with an external transmitter/receiver; grounds 6A and 6B which are connected to another end of inter-digital transducers 3A and 3B, respectively; ground electrode 7 which is formed on the underside surface of Si board 1 and connected with grounds 6A and 6B via through holes; and pressure receiver 8.

Pressure receiver 8 is provided on dielectric film 2, and it projects upward from pressure sensor 0 so that the tip of pressure receiver 8 contacts button 12. When external pressure is applied on button 12, the pressure is transferred to dielectric film 2 via pressure receiver 8, and dielectric film 2 becomes warped and thereby the frequency of a surface acoustic wave generated on dielectric film 2 is altered.

On the underside surface of board 1, a concave having a tapered inner side surface with a 54.75 degrees is formed by anisotropic etching, the bottom of which is diaphragm 1B susceptible to external pressure. Oxide film 1A is rendered a little thicker in the drawing, but in fact how thick oxide film 1A is does not matter as long as it can provide insulation between board 1 and dielectric film 2.

Inter-digital transducers 3A and 3B, antennas 4A and 4B, impedance matching units 5A and 5B, and grounds 6A and 6B are formed integrally as a conductive pattern. A material of the conductive pattern may be a metal such as Ti, Cr, Cu, W, Ni, Ta, Ga, In, Al, Pd, Pt, Au, and Ag, and an alloy such as Ti—Al, Al—Cu, Ti—N, and Ni—Cr. In the metals, especially Au, Ti, W, Al, and Cu are preferable. The conductive pattern preferably consists of a single layer or multilayer structure of the metal or alloy. The thickness of the metal layer preferably ranges from 1 nanometer to under 10 micrometers.

In pressure sensor 0, $LiTaO_3$ is used as a material of dielectric film 2. In a crystal of $LiTaO_3$, the propagation velocity of its surface acoustic wave changes is responsive to a pressure change. The temperature coefficient of a crystal of $LiTaO_3$ is approximately $18.0 \times 10^{-6}$ per degree, which is one fourth that of $LiNbO_3$, and when the temperature of a crystal of $LiTaO_3$ changes by 10 degrees, the frequency of a surface acoustic wave changes by 0.005 percent.

Since dielectric film 2 is laid on diaphragm 1B via oxide film 1A, if external pressure of 2 bars is applied to diaphragm 1B, a warp of diaphragm 1B causes the distance between inter-digital transducers 3A and 3B on dielectric film 2 to change, and thereby the velocity of a surface acoustic wave is altered. Consequently, the frequency of the surface acoustic wave changes from center frequency f0 (approximately 300 MHz) by 0.2 percent. If the temperature change of a measuring object is significant, the frequency of a surface acoustic wave may be corrected by using a temperature sensor in combination.

Dielectric film 2 may be epitaxial or may have a single orientation in view of the electromechanical coupling coefficient/piezoelectric coefficient of inter-digital transducer 3 and of the dielectric loss of antenna 4. Also, on dielectric film 2, a film including a III-V series semiconductor such as GaAs or carbon such as diamond may be formed. As a result, the surface velocity of a surface acoustic wave, the coupling coefficient, and the piezoelectric constant are improved.

The frequency of a surface acoustic wave of pressure sensor 0 depends on the shapes of inter-digital transducers 3A and 3B and impedance matching units 5A and 5B. Inter-digital transducers 3A and 3B, antennas 4A and 4B, and impedance matching units 5A and 5B generate a mechanical vibration of the same center frequency as that of a radio signal sent from an external transmitter, and the strength of a radio signal received by an external receiver from pressure sensor 0 is altered by the change of a frequency of a surface acoustic wave generated on dielectric film 2 of pressure sensor 0.

In pressure sensor 0 discussed above, a concave is formed on board 1, the bottom of which is used as diaphragm 1B. However, oxide film 1A may be used as a diaphragm. In summary, as long as an external pressure affects dielectric film 2 directly or indirectly, the configuration of diaphragm 1B does not matter.

Second, a basic operation of pressure sensor 0 will be described. For clarity of explanation, it is assumed in the following description that a signal in FIG. 4(a) travels from antenna 4A to antenna 4B. However, the signal may travel from antenna 4B to antenna 4A.

Pressure sensor 0 exchanges radio signals with transmitter 21A and receiver 21B of transmitter/receiver 21. A sensor interrogation signal having the frequency of approximately 300 MHz sent from transmitter 21A is received by antenna 4A, and inter-digital transducer 3A, in response to the signal, excites dielectric film 2 to generate a mechanical vibration. The mechanical vibration in turn generates a surface acoustic wave on dielectric film 2. The surface acoustic wave is propagated from inter-digital transducer 3A toward inter-digital transducer 3B. The surface acoustic wave which has reached inter-digital transducer 3B is converted by inter-digital transducer 3B to an electrical signal and sent as a sensor response signal via antenna 4B.

During the propagation of the surface acoustic wave, if an external pressure is applied on diaphragm 1B via pressure receiver 8, dielectric film 2 becomes warped, and causes the surface acoustic wave to vary in response to the warp in terms of the attributes of the surface acoustic wave such as amplitude, phase difference, and frequency, etc.

Next, a basic operation of information providing system 100 according to the present embodiment will be described with reference to FIG. 5.

Information notifying apparatus 20 sends a sensor interrogation signal having a center frequency of 300 MHz via transmitter/receiver 21 (Step Sa1).

When the sensor interrogation signal is received by wireless sheet 10 (Step Sa2), a surface acoustic wave is generated on dielectric film 2 of pressure sensor 0 of wireless sensor 10. Pressure sensor 0 sends a sensor response signal regardless of whether an external pressure is applied on button 12 (Step Sa3), but IC tag 11 of wireless sheet 10 does not function because it is not tunable for the frequency of 300 MHz of the received signal.

When sending a sensor response signal, if button 12 is not pressed, pressure sensor 0 sends a sensor response signal having the same attribute (e.g. frequency) as that of the received sensor interrogation signal. On the other hand, if button 12 is pressed, pressure sensor 0 sends a sensor response signal with an attribute which has changed (e.g. a frequency which has changed from the center frequency), as described in the above explanation of an operation of pressure sensor 0.

Information notifying apparatus 20 receives the sensor response signal via transmitter/receiver 21 (Step Sa4), and analyzes the signal (Step Sa5) to determine whether button 12 has been pressed (Step Sa6).

Specifically, information notifying apparatus 20 finds the difference between the frequency of the sensor response signal and the center frequency of the sensor interrogation signal to determine whether the difference is equal to or more than a predetermined value. On the basis of the determination, information notifying apparatus 20 determines whether button 12 has been pressed.

In the information providing system, the operations of Steps Sa1 to Sa6 will continue to be carried out until button 12 is pressed.

Information notifying apparatus 20, if determining that button 12 has been pressed (Step Sa6; YES), sends an ID interrogation signal having the frequency of 125 kHz or 2.45 GHz via transmitter/receiver 21 to obtain identification data (Step Sa7).

IC tag 10, when receiving the ID interrogation signal (Step Sa8), sends identification data stored in its IC chip as an ID response signal (Step Sa9).

Information notifying apparatus 20, when receiving the ID response signal via transmitter/receiver 21 (Step Sa10), obtains the identification data from the ID response signal (Step Sa11).

Subsequently, information notifying apparatus 20 searches an information table (see FIG. 2) stored in storage area 30E by the obtained identification data to read message information D (Step Sa12), and displays message information D on display 22.

As described above, in information providing system 100, only when button 12 of wireless sheet 10 is pressed will message information D be displayed on display 22 of information notifying apparatus 20.

Figure 6A:
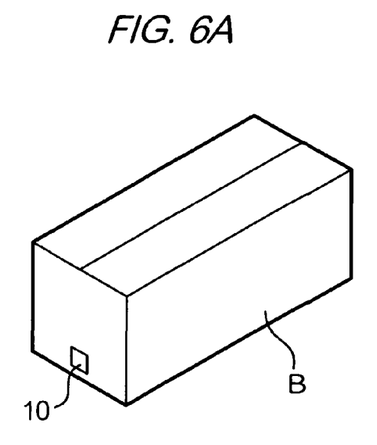
FIGS. 6(a) and 6(b) are diagrams illustrating a wireless sheet and an article to which the wireless sheet is attached.

Next, application examples of information providing system 100 according to the present embodiment will be described.
(1) In a Case where a Worker Brings in Merchandise In this application, wireless sheet 10 is attached on the downside of a side of box B containing merchandise as shown in FIG. 6(*a*), namely a position on box B where a worker places his/her hand when lifting.

Also, in an information table shown in FIG. 2, the name of merchandise, description of merchandise, a storage location, etc. are stored for each identification data in advance.

Since wireless sheet 10 is attached to a position where a worker places his/her hand, when lifting box B, button 12 of wireless sheet 10 is pressed. Consequently, a sensor response signal indicating that button 12 has been pressed is sent from wireless sheet 10, and the signal is received by information notifying apparatus 20. Information notifying apparatus 20 sends an ID interrogation signal to IC tag 11 of wireless sheet 10 to obtain identification data, and displays on display 22 message information D such as the name of merchandise and storage location corresponding to the identification data obtained from IC tag 11.

According to the application, a worker, when bringing in box B, can obtain message information D of merchandise contained in box B, without performing an operation of reading identification data from wireless sheet 10 attached to box B while carrying out the delivery of box B. As a result, a worker's efficiency is improved.

Also, if plural boxes B with wireless sheet 10 attached are placed within range of a radio signal sent from information notifying apparatus 20, message information D of merchandise contained only in box B whose wireless sheet 10 is pressed by a hand of a worker is provided. Accordingly, a problem of accidentally being provided message information D of merchandise contained in other boxes B, which a worker does not ask for can be avoided.
(2) In a Case Where a Worker Performs Maintenance of an Apparatus As an example of maintenance, a case is described where a toner cartridge is put into image forming apparatus 200 to which information providing system 100 according to the present embodiment is applied.

In this application, wireless sheet 10 is attached to a handle of a toner cartridge.

Figure 7:
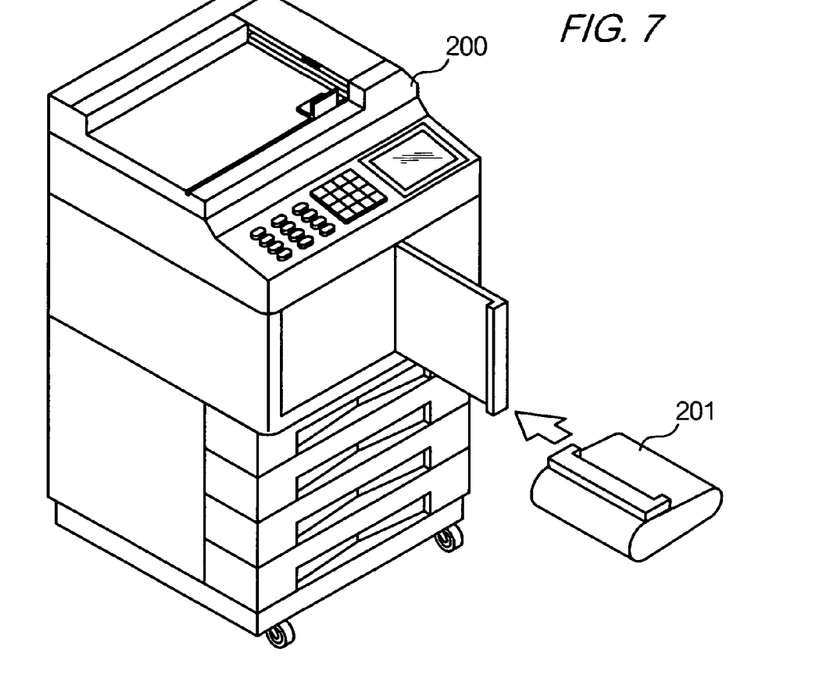
FIG. 7 is a diagram illustrating a toner cartridge position in an image forming apparatus.

Also, in an information table shown in FIG. 2, image data showing a location where a toner cartridge is to be inserted, as shown in FIG. 7 is stored for identification data of wireless sheet 10 attached to the toner cartridge.

Since wireless sheet 10 is attached to a handle of the toner cartridge, when a worker holds the handle to insert the toner cartridge into image forming apparatus 200, button 12 of wireless sheet 10 is pressed. Consequently, a sensor response signal indicating that button 12 has been pressed is sent from wireless sheet 10 to image forming apparatus 200. Image forming apparatus 200 sends an ID interrogation signal to IC tag 11 of wireless sheet 10 to obtain identification data, and displays on its display an image shown in FIG. 7 which is message information D corresponding to the identification data obtained from IC tag 11.

By referring to the displayed image, the worker can know the location on Image forming apparatus 200 where the toner cartridge is to be inserted.
(3) In Other Cases Information providing system 100 may be applied to a display of merchandise, inventory control of merchandise, and a display of merchandise information to a consumer, etc.

As described above, according to information providing system 100, a user can obtain message information of an article to which wireless sheet 10 is attached by pressing button 12 of wireless sheet 10. Since wireless sheet 10 is attached to a position where the user places his/her hand when lifting the article, the user can obtain information on the article without performing an operation of reading identification data from wireless sheet 10 when carrying out the delivery of an article.

Also, if there are plural wireless sheets 10 within range of a radio signal sent from transmitter/receiver 21 of information notifying apparatus 20, information of only an article whose wireless sheet 10 is pressed by a user is displayed. Accordingly, a problem of accidentally being provided information on an article which a user does not ask for can be avoided.

2. Second Embodiment

Figure 8:
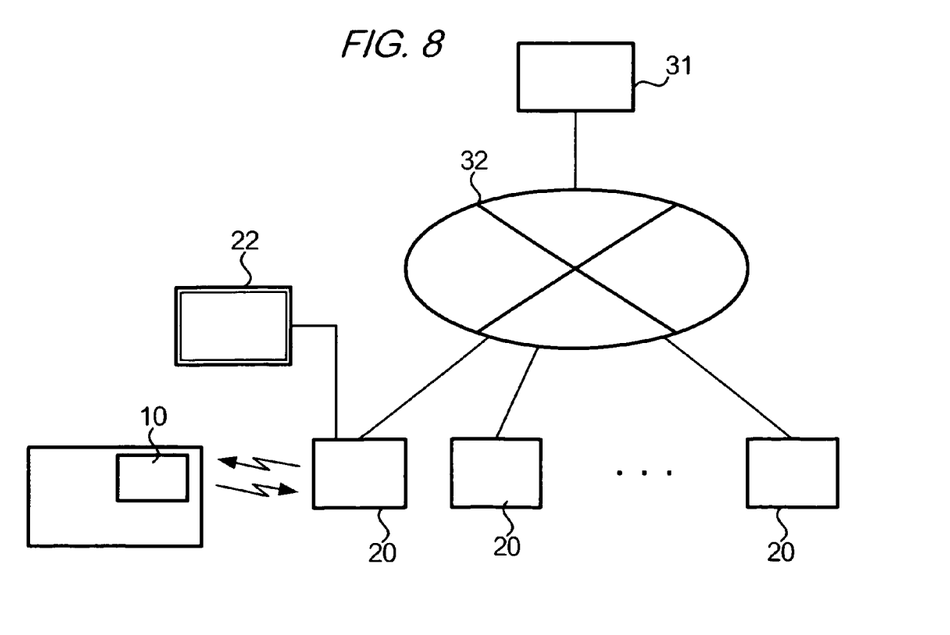
FIG. 8 is a diagram illustrating a configuration of an information providing system according to the second embodiment of the present invention.
Figure 9:
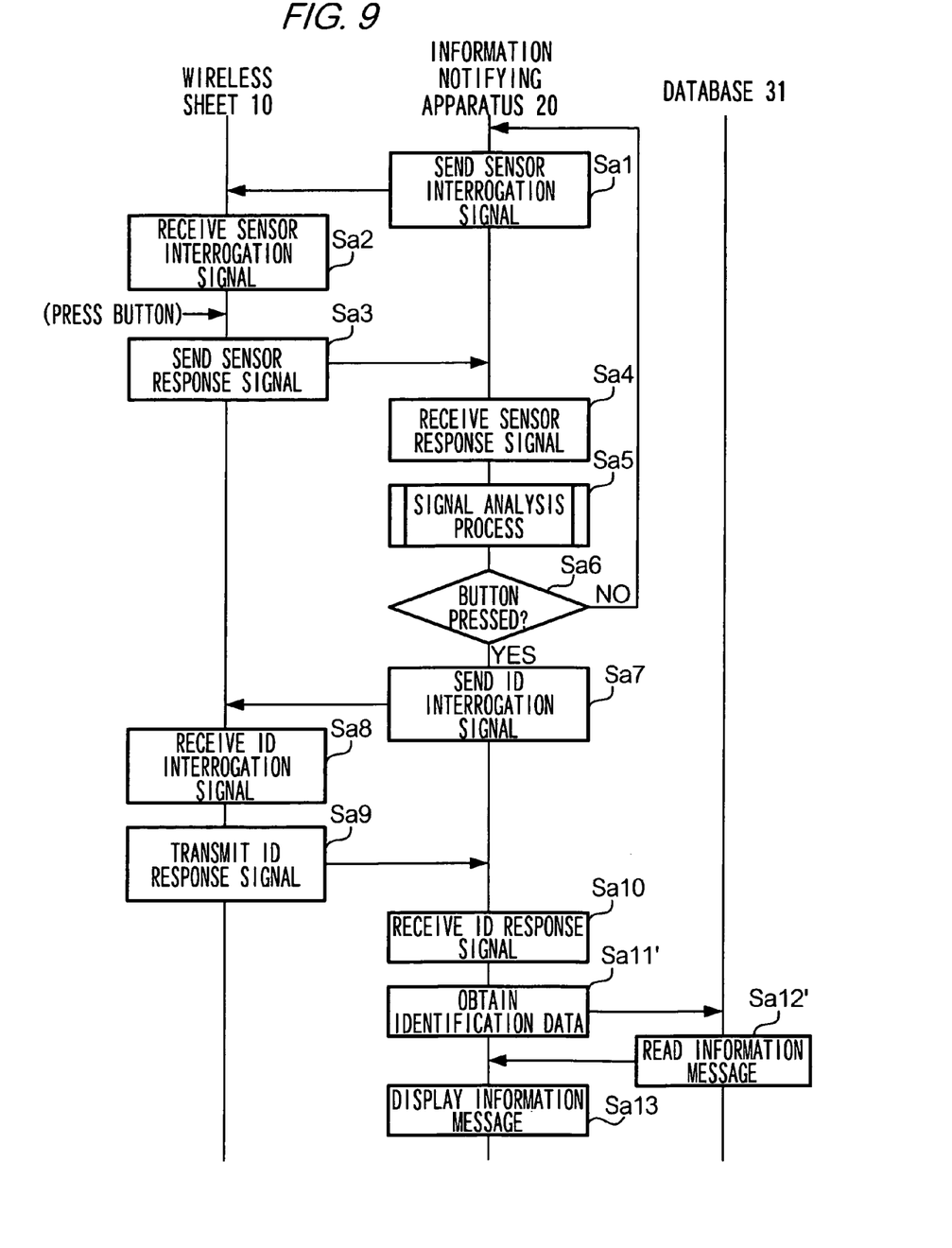
FIG. 9 is a sequence chart illustrating an operation of an information providing system according to the second embodiment.

The second embodiment of the present invention will be described with reference to FIGS. 8 and 9. An information providing system according to the present embodiment is characterized by including plural information notifying apparatuses 20 connected to network 32 and database 31 storing an information table shown in FIG. 2 connected to network 32. Below, an explanation of components shared with the first embodiment is omitted, and the same reference numbers as those of the first embodiment will be used.

In the information providing system, plural information notifying apparatuses 20 and database 31 are connected to network 32. Network 32 may be the Internet and a LAN (Local Area Network) connection. Database 31 contains an information table shown in FIG. 2 where message information D is associated with identification data.

Next, an operation of the information providing system will be described with reference to FIG. 9.

Figure 5:
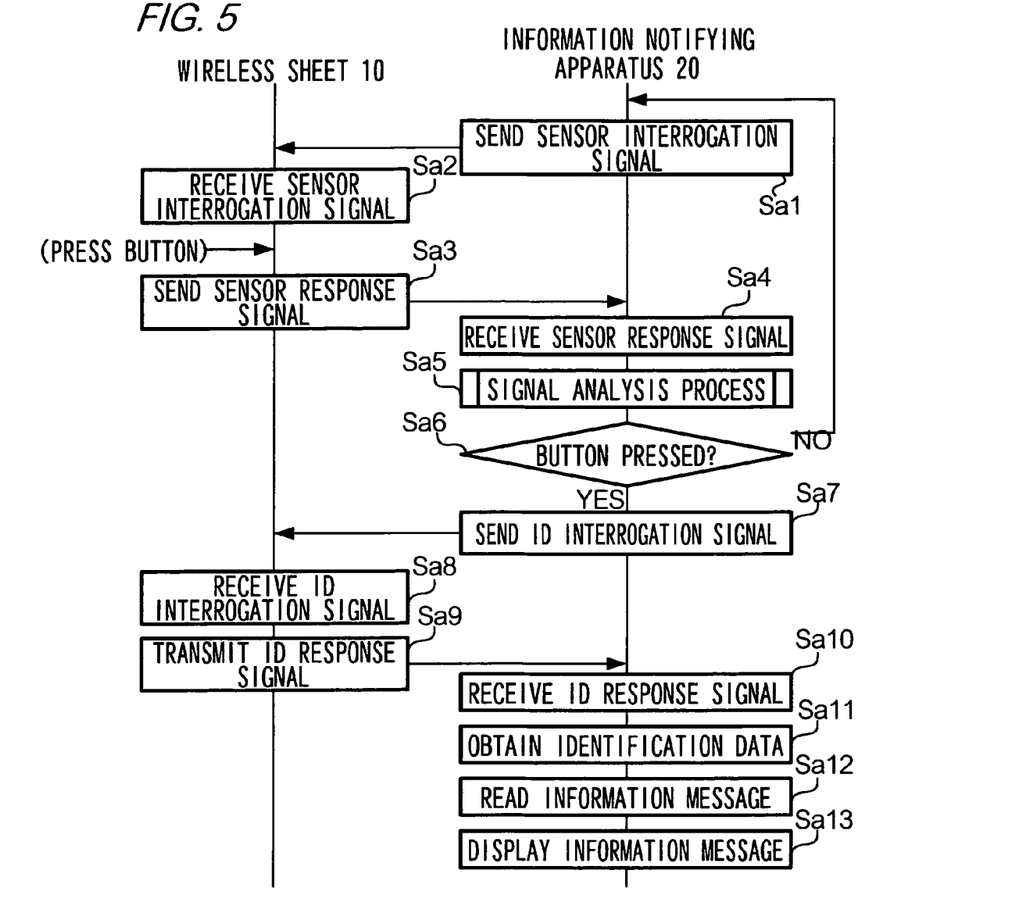
FIG. 5 is a sequence chart illustrating an operation of an information providing system according to the first embodiment.

In the drawing, since Steps Sa1 to Sa10 are the same as those of FIG. 5, an explanation of the steps is omitted.

When receiving an ID response signal in Step Sa10, information notifying apparatus 20 obtains identification data from the ID response signal and sends an information request together with the identification data to database 31 via network 32 (Step Sa11'). Database 31 searches an information table stored therein by the identification data to read message information D (Step Sa12'), and sends message information D to information notifying apparatus 20. Information notifying apparatus 20 displays message information D on display 22.

In this embodiment, if a history of accesses from each of information notifying apparatuses 20 is stored in database 231, confirmation of the inventory status the progress of a work can be made easier.

3. Third Embodiment

The third embodiment of the present invention will be described with reference to FIGS. 10 to 12. Specifically, a case will be described where a position of a component relative to a position where the component should be installed is displayed on display 22 of information notifying apparatus 20' in an assembly process.

Information providing system 20' according to the present embodiment is characterized in that the distance between wireless sensor 10 and transmitter/receiver 21 of information notifying apparatus 20' is calculated on the basis of a sensor response signal sent from pressure sensor 0 of wireless sheet 10 and displayed in addition to the message information. The signal strength or the phase of a radio signal sent from pressure sensor 0 changes according to the distance at which transmitter/receiver 21 is located when an applied pressure remains constant or when no pressure is applied. Therefore, the distance between wireless sensor 10 and transmitter/receiver 21 can be identified from the amount of change of the signal strength or the phase of a radio signal sent from pressure sensor 0.

Below, an explanation of components shared with the first embodiment is omitted, and the same reference numbers as those of the first embodiment will be used.

Figure 10:
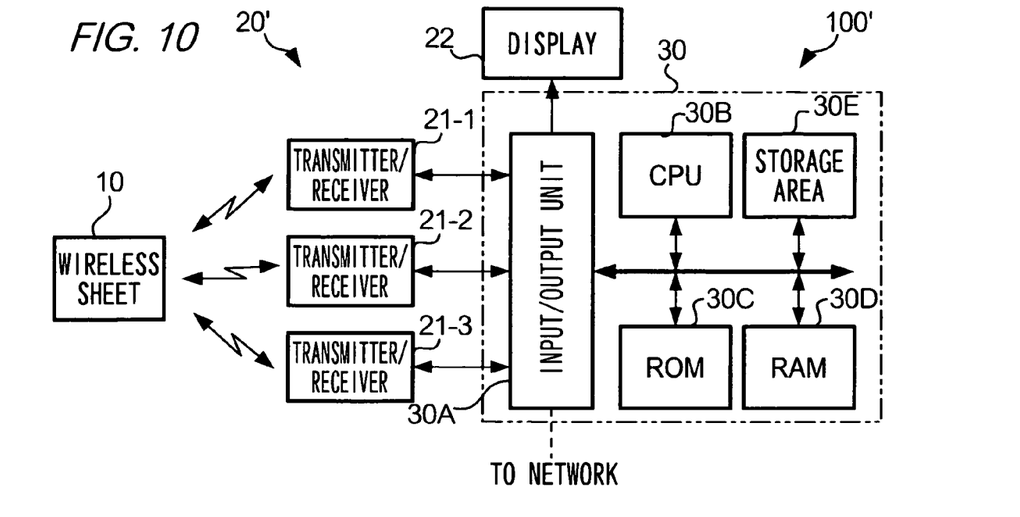
FIG. 10 is a diagram illustrating a configuration of an information providing system according to the third embodiment of the present invention.
Figure 11:
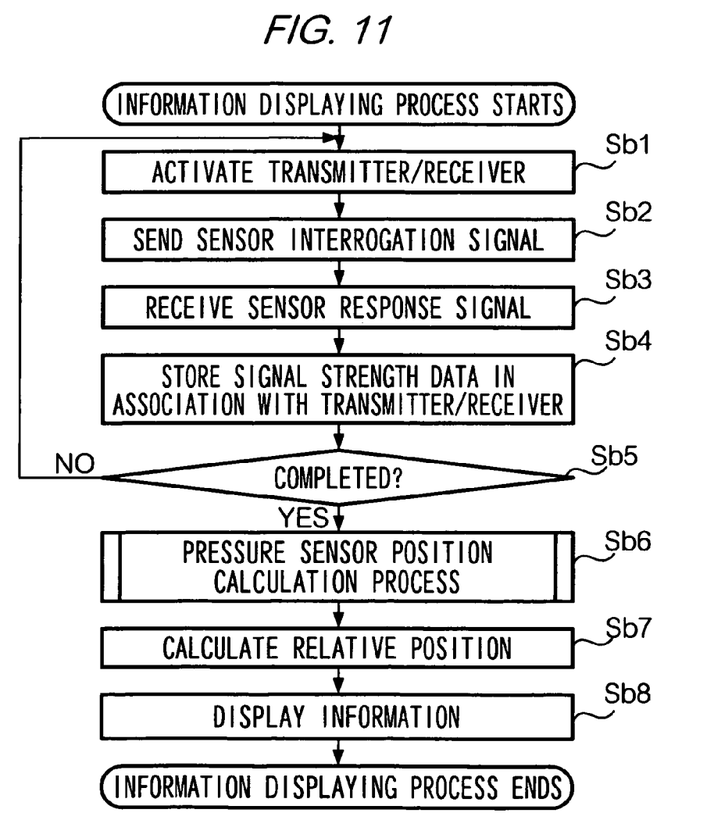
FIG. 11 is a flowchart illustrating an operation of an information providing system according to the third embodiment.

FIG. 10 is a diagram illustrating a basic configuration of information providing system 100' according to the present embodiment. Information providing system 100' includes wireless sheet 10 and information notifying apparatus 20', and a configuration of information notifying apparatus 20' is the same as that of information notifying apparatus 20 according to the first embodiment except for three transmitter/receivers 21-1, 21-2, and 21-3.

ROM 30C of controller 30 stores a program for displaying distance information on display 22. Storage area 30E stores a position information table where data on coordinates (X0, Y0, Z0) indicating a position where a component should be installed is associated with identification data.

Figure 12:
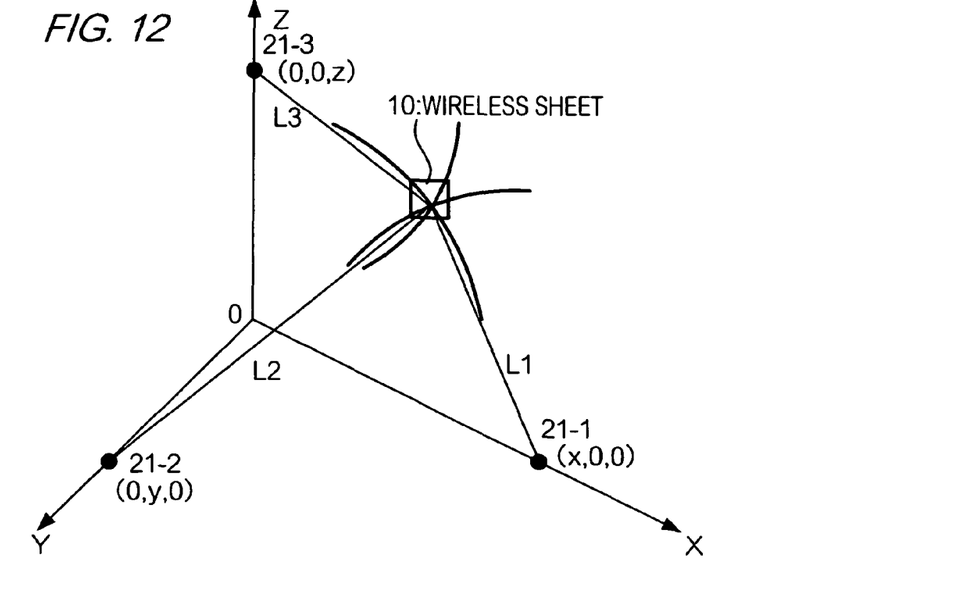
FIG. 12 is a diagram illustrating a concrete example of a position calculation process of a pressure sensor according to the third embodiment.

Transmitter/receivers 21-1, 21-2, and 21-3 are arranged, as shown in FIG. 12, on x, y, and z axes intersecting at origin 0 at right angles to one another, respectively. Specifically, transmitter/receiver 21-1 is arranged at coordinates (x, 0, 0) on x axis, transmitter/receiver 21-2 is arranged at coordinates (0, y, 0) on y axis, and transmitter/receiver 21-3 is arranged at coordinates (0, 0, z) on z axis. However, the arrangement is for convenience of explanation, and positions of transmitter/receivers 21-1, 21-2, and 21-3 are not limited to the above-described positions.

Next, an information display process of information providing system 100' will be described with reference to FIGS. 11 and 12. The process is performed after a display of message information D of the first embodiment.

CPU 30B of information notifying apparatus 20' activates transmitter/receivers 21-1, 21-2, and 21-3 and sends a sensor interrogation signal via each transmitter/receiver (Steps Sb1 and Sb2). When transmitter/receiver 21-1, 21-2, or 21-3 receives a sensor response signal (Step Sb3), CPU 30B stores in RAM 30D data on the signal strength of the received sensor response signal in association with a transmitter/receiver which has received the signal (Step Sb4). CPU 30B determines whether data on the signal strengths of three sensor response signals have been stored (Step Sb5). If the determination is affirmative (Step Sb5; YES), CPU 30B calculates a position of pressure sensor 0, namely wireless sheet 10, on the basis of the signal strength data stored in RAM 30D (Step Sb6).

Specifically, at first, CPU 30B calculates on the basis of each signal strength data, the distance along a straight line L1 between transmitter/receiver 21-1 at coordinates (x, 0, 0) and pressure sensor 0, the distance along a straight line L2 between transmitter/receiver 21-2 at coordinates (0, y, 0) and pressure sensor 0, and the distance along a straight line between transmitter/receiver 21-3 at coordinates (0, 0, z) and pressure sensor 0. Second, CPU 30B calculates the intersection of a sphere with radius L1 centering on the position of transmitter/receiver 21-1, a sphere with radius L2 centering on the position of transmitter/receiver 21-2, and a sphere with radius L3 centering on the position of transmitter/receiver 21-3, namely position P (X, Y, Z) of pressure sensor 0.

Subsequently, CPU 30B compares position P (X, Y, Z) of pressure sensor 0 and coordinates (X0, Y0, Z0) indicating a position where a component should be installed to calculate a relative position (X-X0, Y-Y0, Z-Z0) (Step Sb7). The relative position (X-X0, Y-Y0, Z-Z0) is stored in RAM 30D as distance information.

Subsequently, CPU 30B causes display 22 to display the distance information (Step Sb8).

The distance information may be displayed as it is, namely as distances on x, y, and z axes, or as a diagram as shown in FIG. 7 which illustrates how a component is installed in an apparatus.

The relative position may be identified and calculated in two dimensions or as a distance in a straight line, not in three dimensions. In this case, one or two transmitter/receivers 21 are used.

As described above, according to information providing system 100' of the present embodiment, the distance between wireless sheet 10 and transmitter/receiver 21 of information notifying apparatus 20' is calculated on the basis of a sensor response signal from pressure sensor 0 and displayed to a user.

4. Modifications 4-1. Types of Sensors

In the above embodiments, as a wireless sensor of wireless sheet 10, an acceleration sensor, a temperature sensor, or a light sensor may be used, instead of pressure sensor 0. Below, the configurations of the acceleration sensor, the temperature sensor and the light sensor will be described.

<Acceleration Sensor>

Figure 13A:
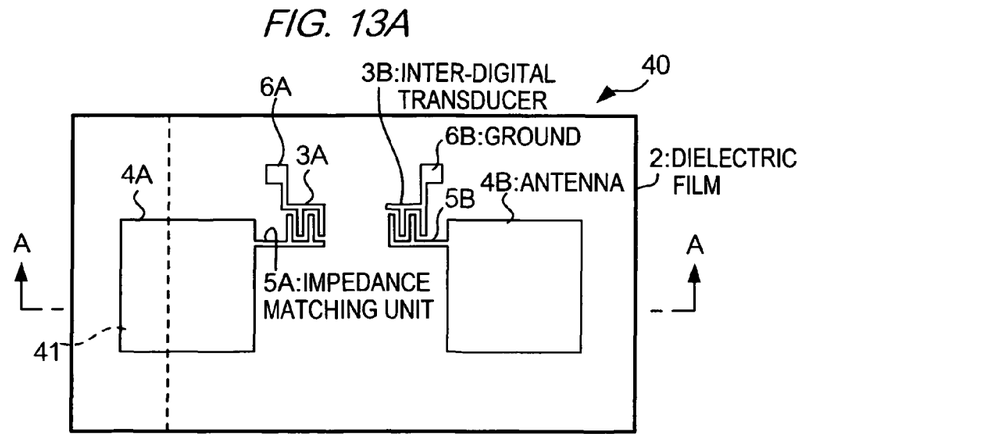
FIG. 13 is a diagram illustrating a structure of a wireless acceleration sensor.

FIG. 13 is a diagram illustrating a configuration of acceleration sensor 40. As shown in the drawing, acceleration sensor 40 is different from pressure sensor 0 shown in FIG. 4 in not having pressure receiver 8 and diaphragm 1B, and in having base 41 on its under surface which supports one end of acceleration sensor 40. The other components are the same as those of pressure sensor 0, so an explanation thereof is omitted and the same reference numbers will be used.

Figure 13B:
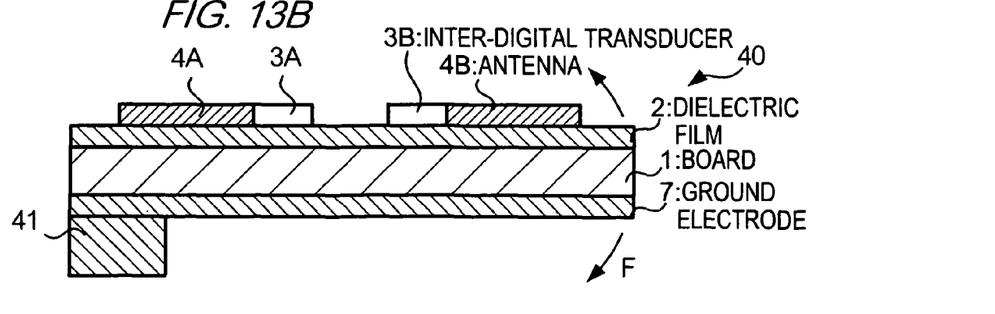

Since acceleration sensor 40 has base 41 on its under surface which supports one end of acceleration sensor 40, if a force F [F=m×α (m: mass, α: acceleration)] is exerted on the other end of board 1 of acceleration sensor 40 as shown in FIG. 13(b), board 1 bends in response to the acceleration, and the bending is measured. In summary, acceleration sensor 40 functions as a strain gauge.

For example, if a force (acceleration: 980 m/s$^2$) is exerted on the other end of board 1 of acceleration sensor 40, board 1 bends in response to the acceleration. The bending causes the distance between inter-digital transducers 3A and 3B on dielectric film 2 to change, and thereby the velocity of a surface acoustic wave changes from center frequency f0 by 0.1 percent. If the temperature change of a measuring object is significant, the frequency of a surface acoustic wave may be corrected by using a temperature sensor in combination with acceleration sensor 40.

In acceleration sensor 40, LiTaO$_3$ is used as a material of dielectric film 2 of FIG. 13.

Figure 6B:
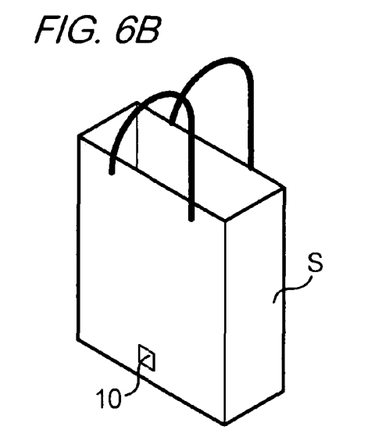

In a case where pressure sensor 0 of wireless sheet 10 is replaced with acceleration sensor 40 and wireless sheet 10 is attached to bag S as shown in FIG. 6(b), in the event that bag S is moved and the acceleration is sensed by acceleration sensor 40, information on an article in bag S can be obtained. In a case where acceleration sensor 40 is used, wireless sheet 10 need not necessarily be attached to a position where a hand would be placed.

<Temperature Sensor>

Figure 14A:
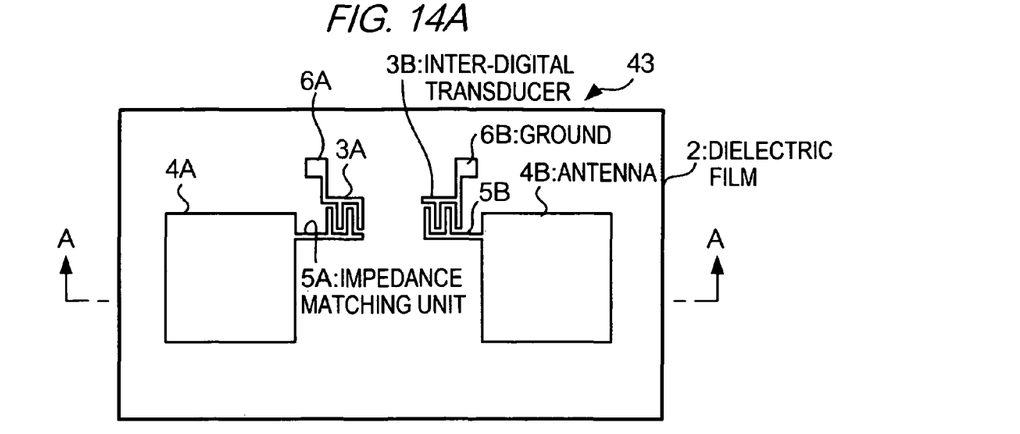
FIG. 14 is a diagram illustrating a structure of a wireless temperature sensor.
Figure 14B:
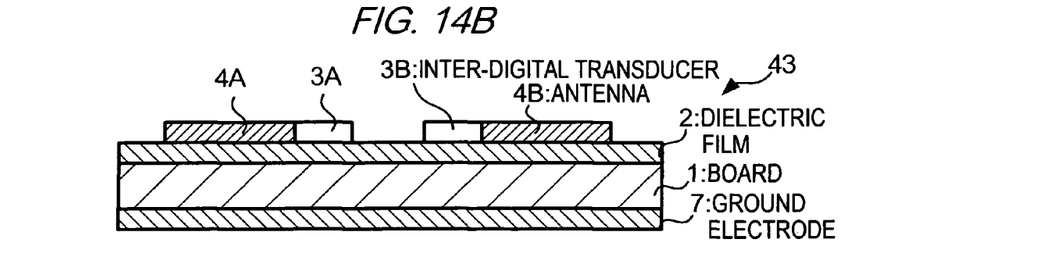

FIG. 14 is a diagram illustrating a configuration of temperature sensor 43. As shown in the drawing, temperature sensor 43 is different from pressure sensor 0 shown in FIG. 4 in not having pressure receiver 8 and diaphragm 1B. The other components are the same as those of pressure sensor 0, so an explanation thereof is omitted and the same reference numbers will be used.

In temperature sensor 43, LiNbO$_3$ is used as a material of dielectric film 2 of FIG. 14. In a crystal of LiNbO$_3$, the propagation velocity of its surface acoustic wave is responsive to a temperature change, and a change of the propagation velocity due to a temperature change causes the frequency of a surface acoustic wave to change. The temperature coefficient is approximately $75 \times 10^{-6}$ per degree. An experiment shows, as an example, that when the temperature of a crystal of LiNbO$_3$ changes by 100 degrees, the frequency of a surface acoustic wave changes from center frequency f0 to by 0.2 percent to 0.3 percent.

Accordingly, in a case where pressure sensor 0 of wireless sheet 10 is replaced with temperature sensor 43, if the wireless sheet is touched by hand and the heat of the hand is sensed by temperature sensor 43, information on an article to which the wireless sheet is attached can be obtained.

<Light Sensor>

Figure 15A:
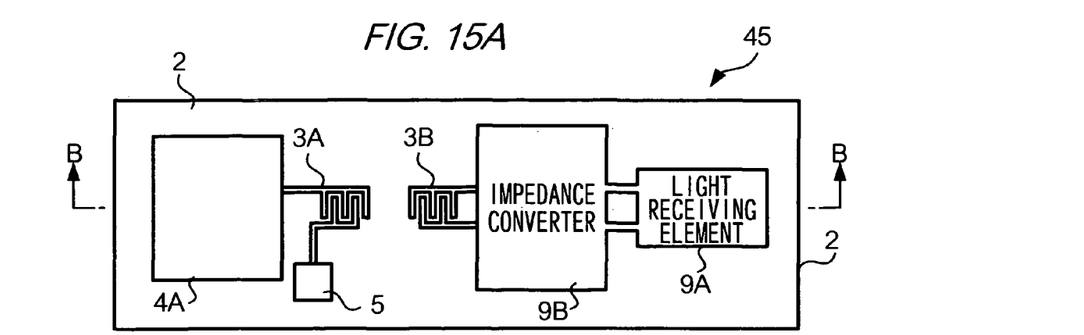
FIG. 15 is a diagram illustrating a structure of a wireless light sensor.
Figure 15B:
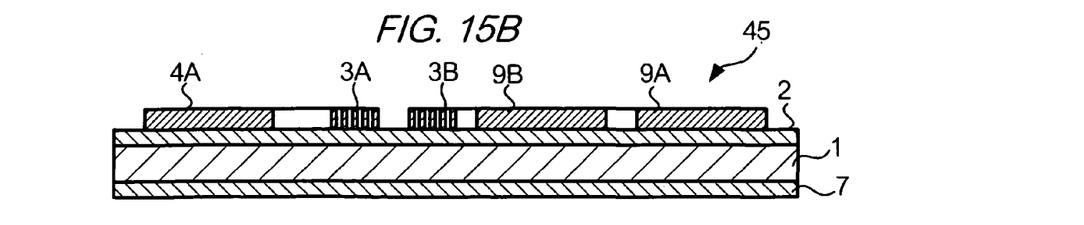

FIG. 15 is a diagram illustrating a configuration of light sensor 45. As shown in the drawing, light sensor 45 is different from pressure sensor 0 shown in FIG. 4 in that one of inter-digital transducers 3A and 3B is connected to impedance converter 9B and light receiving element 9A (e.g. photodiode). In light sensor 45, LiTaO$_3$ is used as a material of dielectric film 2.

For example, when light (illuminance: 10001x) is irradiated on light receiving element 9A, the impedance of light receiving element 9A changes in response to the luminous intensity. The impedance change of light receiving element 9A causes the impedance of inter-digital transducer 3B to change via impedance converter 9B which matches impedances of light receiving element 9A and inter-digital transducer 3B. Consequently, the reflection intensity of inter-digital transducer 3B in reflecting a surface acoustic wave propagated from inter-digital transducer 3A changes. As a result, the strength of a radio signal sent from light sensor 40 changes from a standard electric field strength by 0.1 percent.

Accordingly, in a case where pressure sensor 0 of wireless sheet 10 is replaced with light sensor 45 and if the wireless sheet is shaded by a hand, light sensor 45 can sense that the light is blocked, and information on an article to which the wireless sheet is attached can be obtained.

A wireless sensor is not limited to the surface-acoustic-wave sensors described above, but may be a passive sensor having a power converter circuit or a passive sensor having a delay circuit.

4-2. Method of Obtaining Identification Data

In the above embodiments, IC tag 11 storing identification data is provided in wireless sheet 10, and wireless sheet 10 is identified by the identification data. However, wireless sheet 10 may be identified by the frequency of a radio signal sent from pressure sensor 0 provided in pressure sensor 0. Below, a description of the identifying method will be provided with reference to FIG. 16. The pressure sensor 0 may be the sensors described in Modification 4-1, and below, the sensors including pressure sensor 0 will be referred to as "a wireless sensor".

Figure 16:
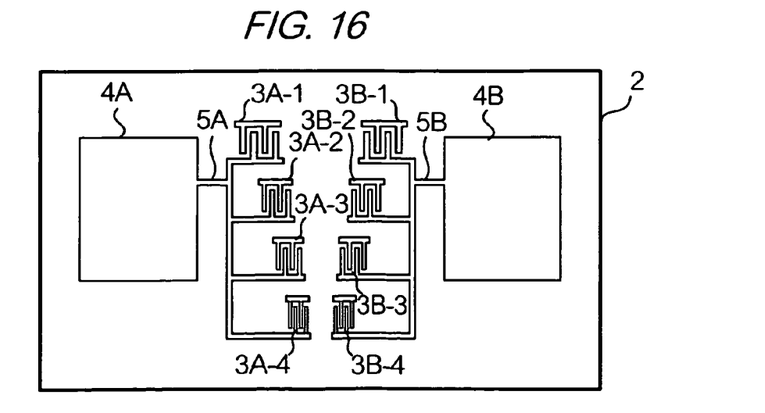
FIG. 16 is a diagram illustrating a structure of a wireless sensor tunable for plural frequencies according to the third embodiment.

As shown in FIG. 16, a wireless sensor is provided with inter-digital transducers 3A-1 to 3A-4 and 3B-1 to 3B-4, which are different to each other in shape. In the wireless sensor, surface acoustic waves corresponding to plural frequencies for which inter-digital transducers 3A-1 to 3A4 and 3B-1 to 3B-4 can be tuned are generated on dielectric film 2.

For example, it is assumed that inter-digital transducers 3A-1 and 3B-1 and impedance matching units 5A and 5B are tunable for frequency f1, inter-digital transducers 3A-2 and 3B-2 and impedance matching units 5A and 5B are tunable for frequency f2, inter-digital transducers 3A-3 and 3B-3 and impedance matching units 5A and 5B are tunable for frequency f3, and inter-digital transducers 3A-4 and 3B-4 and impedance matching units 5A and 5B are tunable for frequency f4.

Please note that in FIG. 16, grounds and a ground electrode are omitted.

If a radio signal having frequency f1 is sent from an external transmitter, inter-digital transducer 3A-1 generates a mechanical vibration, which causes a surface acoustic wave on dielectric film 2. The surface acoustic wave is propagated to inter-digital transducer 3B-1, during which the attribute of the surface acoustic wave changes under the influence of pressure.

On the other hand, in the other inter-digital transducers 3A-2 to 3A-4 and 3B-2 to 3B-4, generation of a surface acoustic wave and subsequent transmission of a radio signal are not performed, because they are not tuned for frequency f1.

If a radio signal having frequency f2 is sent to the wireless sensor, a surface acoustic wave is propagated from inter-digital transducer 3A-2 to inter-digital transducer 3B-2, and a radio signal corresponding to the surface acoustic wave is sent via antenna 4B.

If a radio signal having frequency f3 is sent to the wireless sensor, a surface acoustic wave is propagated from inter-digital transducer 3A-3 to inter-digital transducer 3B-3, and a radio signal corresponding to the surface acoustic wave is sent via antenna 4B.

If a radio signal having frequency f4 is sent to the wireless sensor, a surface acoustic wave is propagated from inter-digital transducer 3A-4 to inter-digital transducer 3B-4, and a radio signal corresponding to the surface acoustic wave is sent via antenna 4B.

Accordingly, if four radio signals which have frequencies f1, f2, f3, and f4 respectively are sent to the wireless sensor in a certain order, an external receiver receives signals corresponding to the frequencies in that order.

In this case, if the variation widths (the width of a change due to a pressure) of the frequency of a radio signal sent from inter-digital transducers 3B-1 to 3B4 (output side) are set so that they do not overlap with each other, even if the four radio signals having frequencies f1 to f4 respectively are sent to the wireless sensor simultaneously, the four signals received in response can be separated and analyzed.

For example, it is assumed that four wireless sensors are provided in four wireless sheets 10, respectively. Specifically, first wireless sheet 10 has a wireless sensor where inter-digital transducers 3A-1 and 3B-1 shown in FIG. 16 are formed; second wireless sheet 10 has a wireless sensor where inter-digital transducers 3A-2 and 3B-2 shown in FIG. 16 are formed; third wireless sheet 10 has a wireless sensor where inter-digital transducers 3A-3 and 3B-3 shown in FIG. 16 are formed; and fourth wireless sheet 10 has a wireless sensor where inter-digital transducers 3A-4 and 3B-4 shown in FIG. 16 are formed. Accordingly, the frequency of a surface acoustic wave generated on dielectric film 2 of each wireless sensor is f1, f2, f3, and f4, respectively. Accordingly, on the basis of the frequency of a received radio signal, it can be determined as to which of the wireless sheets 10 is the source of the radio signal.

According to the identifying method, Steps Sa7 to Sa10 of FIG. 5 described in the first embodiment can be omitted.

In the above description, each wireless sheet may be identified by any method, which makes response signals from wireless sheets distinguishable, other than a method of differentiating the frequencies of radio signals sent from wireless sensors. For example, it is possible to differentiate the distance between inter-digital transducers 3A and 3B of each wireless sensor and thereby differentiate the frequency of a surface acoustic wave generated on dielectric film 2. By differentiating the distance between inter-digital transducers 3A and 3B of each wireless sensor, the propagation time of a surface acoustic wave generated on dielectric film 2 of each wireless sensor is differentiated. Accordingly, by measuring a time from transmission of a radio signal by an external transmitter/receiver to reception of a radio signal by the same unit, each wireless sensor is identified.

Also, the waveform of a radio signal sent to wireless sensor 200 may be any waveform such as a rectangular wave, a sine wave, a chopping wave, etc.

4-3. Material of Wireless Sensor

In the above embodiments, each component of a wireless sensor may be made of other materials.

Board 1 of a wireless sensor may be made of: an elemental semiconductor such as Si, Ge, and diamond; glass; a III-V series compound semiconductor such as AlAs, AlSb, AlP, GaAs, GaSb, InP, InAs, InSb, AlGaP, AlLnP, AlGaAs, AllnAs, AlAsSb, GaInAs, GaInSb, GaAsSb, and InAsSb; a II-VI series compound semiconductor such as ZnS, ZnSe, ZnTe, CaSe, CdTe, HgSe, HgTe, and CdS; oxide such as Nb-doped or La-doped $SrTiO_3$, Al-doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $MgTiO_3$, and $Mg_2TiO_4$, which are conducting or semi-conducting single crystal plate; and metal such as Pd, Pt, Al, Au, Ag. However, in view of the suitability to an existing semiconductor production process and the production cost, it is preferable to use Si, GaAs, glass as a material of board 1.

Dielectric film 2 may be made of: instead of $LiNbO_3$ or $LiTaO_3$, oxide such as $SiO_2$, $SrTiO_3$, $BaTiO_3$, $BaZrO_3$, $LaAlO_3$, $ZrO_2$, $Y_2O_3 8\%$-$ZrO_2$, MgO, $MgAl_2O_4$, $Al_2O_3$, ZnO; a tetragonal system, orthorhombic system, or pseudocubic system material such as $BaTiO_3$, $PbTiO_3$, $Pb_{1-x}La_x(Zr_yTi_{1-y})_{1-x/4}O_3$ (PZT, PLT, PLZT depending on the values of X and Y), $Pb(Mg_{1/3}Nb_{2/3})O_3$, $KNbO_3$, which are $ABO_3$-like perovskite-like; a ferroelectric such as $LiNbO_3$ and $LiTaO_3$ which are a pseudo-ilmenite structure; $SrXBa_{1-x}Nb_2O_6$ and $Pb_xBa_{1-x}Nb_2O_6$ which are tungsten-bronze-like. Dielectric film 2 may also be made of $Bi_4Ti_3O_{12}$, $Pb_2KNb_5O_{15}$, $K_3Li_2Nb_5O_{15}$, and a substitution dielectric of the enumerated ferroelectrics. Dielectric film 2 may be made of $ABO_3$-like perovskite-like oxide including Pb.

Especially, among the materials, $LiNbO_3$, $LiTaO_3$, and ZnO are preferable because the change of the surface velocity of their surface acoustic wave and the change of their piezoelectric constant are outstanding. The thickness of dielectric film 2 may be selected in accordance with the intended use; however, generally, it ranges between 1 micrometer and 10 micrometers.

4-4. Display

In the above embodiments, message information may be provided as voice from a speaker, instead of being displayed on display 22. The provision of message information by voice has an advantage that a worker can receive message information without looking at a display, and which can contribute to an improvement in a worker's efficiency.

As described above, the present invention provides an information providing system including: a wireless sheet attached to an article; and an information notifying apparatus which notifies information on the article in response to a radio signal sent from the wireless sheet, wherein, the wireless sheet includes a wireless measuring unit which, when receiving a radio signal, generates and sends a radio signal by using the received radio signal as an energy source, the sent radio signal having identification data and data of physical quantity measured in the wireless sheet, and the information notifying apparatus includes: a transmitter/receiver which exchanges radio signals with the wireless sheet; a storage unit which stores the identification data and the article information in association with each other; and a notifying unit which extracts from a radio signal received by the transmitter/receiver the identification data and the physical quantity data, and reads the article information stored in association with the identification data in the storage unit, and notifies the article information and the physical quantity data.

Also, the present invention provides an information providing system including: a wireless sheet attached to an article; an information notifying apparatus which notifies information on the article in response to a radio signal sent from the wireless sheet; and a database connected to the information notifying apparatus via a network, wherein, the wireless sheet includes a wireless measuring unit which, when receiving a radio signal, generates and sends a radio signal by using the received radio signal as an energy source, the sent radio signal having identification data and data of physical quantity measured in the wireless sheet, the database stores the identification data and the article information in association with each other, and the information notifying apparatus includes: a transmitter/receiver which exchanges radio signals with the wireless sheet; and a notifying unit which extracts from a radio signal received by the transmitter/receiver the identification data and the physical quantity data, and reads from the database the article information stored in association with the identification data, and notifies the article information and the physical quantity data.

Also, the present invention provides an information providing system including: a wireless sheet attached to an article; an information notifying apparatus which notifies information on the article in response to a radio signal sent from the wireless sheet, wherein, the wireless sheet includes: an identification data transmitter which, when receiving a first radio signal, sends a radio signal having identification data of the wireless sheet or the article; and a wireless measuring unit which, when receiving a second radio signal, generates and sends a radio signal by using the second radio signal as an energy source, the sent radio signal having identification data and data of physical quantity measured in the wireless sheet, and the information notifying apparatus includes: a transmitter/receiver which exchanges radio signals with the wireless sheet; a storage unit which stores the identification data and the article information in association with each other; and a notifying unit which extracts from a radio signal received by the transmitter/receiver the identification data and the physical quantity data, and reads the article information stored in association with the identification data in the storage unit, and notifies the article information and the physical quantity data.

Also, the present invention provides an information providing system including: a wireless sheet attached to an article; an information notifying apparatus which notifies information on the article in response to a radio signal sent from the wireless sheet; and a database connected to the information notifying apparatus via a network, wherein, the wireless sheet includes: an identification data transmitter which, when receiving a first radio signal, sends a radio signal having identification data of the wireless sheet or the article; and a wireless measuring unit which, when receiving a second radio signal, generates and sends a radio signal by using the second radio signal as an energy source, the sent radio signal having identification data and data of physical quantity measured in the wireless sheet, the database stores the identification data and the article information in association with each other, and the information notifying apparatus includes: a transmitter/receiver which exchanges radio signals with the wireless sheet; and a notifying unit which extracts from a radio signal received by the transmitter/receiver the identification data and the physical quantity data, and reads from the database the article information stored in association with the identification data, and notifies the article information and the physical quantity data.

According to an embodiment of the present invention, the physical quantity measured in the wireless sheet may be any one of pressure, temperature, light, and acceleration.

According to another embodiment of the present invention, the wireless measuring unit may include: an exciter which receives a radio signal and generates a mechanical vibration; a vibration medium on which a surface acoustic wave is generated by a mechanical vibration that is generated by the exciter, and on which an attribute of the surface acoustic wave changes in response to physical quantity; and a transmitter which converts a surface acoustic wave generated on the vibration medium to an electrical signal and sends it as a radio signal.

According to another embodiment of the present invention, the information notifying apparatus may further include a distance calculation unit which calculates a distance between the information notifying apparatus and the wireless sheet on the basis of the received radio signal.

Also, the present invention provides an image forming apparatus including: an image forming unit which generates a toner image on the basis of image data, transfers and fixes the toner image on a sheet, and thereby forms an image on the sheet; and an information providing system, wherein the information providing system includes: a wireless sheet attached to a component of the image forming apparatus; and an information notifying apparatus which notifies information on the component in response to a radio signal sent from the wireless sheet, wherein, the wireless sheet includes a wireless measuring unit which, when receiving a radio signal, generates and sends a radio signal by using the received radio signal as an energy source, the sent radio signal having identification data and data of physical quantity measured in the wireless sheet, and the information notifying apparatus includes: a transmitter/receiver which exchanges radio signals with the wireless sheet; a storage unit which stores the identification data and the component information in association with each other; and a notifying unit which extracts from a radio signal received by the transmitter/receiver the identification data and the physical quantity data, and reads the article information stored in association with the identification data in the storage unit, and notifies the component information and the physical quantity data.

According to an embodiment of the present invention, an information request command can be provided from a wireless sheet to an information notifying apparatus. Accordingly, a user can request a notification of desired information on an article to the information notifying apparatus only by touching a wireless sheet, and obtain the information.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. An information providing system comprising:
a wireless sheet attached to an article; and
an information notifying apparatus that sends a first request signal and a second request signal having a different frequency from the first request signal, the second request signal being sent based on a response signal sent from the wireless sheet in response to the first request signal, wherein,
the wireless sheet comprises a wireless measuring unit which, when receiving the request signal, generates and sends the response signal by using the received request signal as an energy source, the response signal including identification data when the request signal is the second request signal and data of physical quantity measured in the wireless sheet when the request signal is the first request signal, the wireless measuring unit comprising:
an exciter that receives the request signal and generates a mechanical vibration;
a vibration medium on which a surface acoustic wave is generated by a mechanical vibration that is generated by the exciter, and on which an attribute of the surface acoustic wave changes due to a distortion of the vibration medium by a physical quantity; and
a transmitter that converts a surface acoustic wave generated on the vibration medium to an electrical signal and sends the electrical signal as the response signal; and
the information notifying apparatus comprises:
a radio unit that exchanges request and response signals with the wireless sheet and that transmits the first request signal to the wireless sheet;
a storage unit that stores the identification data and the article information in association with each other;
a notifying unit that extracts from the response signal at least one of the identification data and the measured data of physical quantity data, and
under the condition that the measured data is extracted and the extracted measured data indicates that the physical quantity is being applied, the radio unit transmits the second request to the wireless sheet, and
under the condition that the identification information is extracted, the notifying unit reads the article information stored in association with the identification data in the storage unit, and notifies the article information and the measured data of physical quantity; and
a distance calculation unit that calculates a distance between the information notifying apparatus and the wireless sheet on the basis of the response signal, wherein
the physical quantity is pressure.

2. The information providing system according to claim 1, wherein the distance calculation unit calculates a distance between the information notifying apparatus and the wireless sheet on the basis of a strength of the response signal.

3. An information providing system according to claim 1, wherein the first request signal is transmitted at a first frequency and the second request signal is transmitted at a second frequency different from the first frequency, and
when the physical quantity is not being applied, the response signal is transmitted at substantially the first frequency, and when the physical quantity is being applied, the response signal is transmitted at a third frequency different from the first frequency.

4. An information providing system according to claim 3, wherein the notifying unit determines whether the physical quantity is being applied by computing a difference between a frequency of the response signal and the first frequency, and comparing the difference to a predetermined value.

5. An information providing system according to claim 3, wherein the first frequency is approximately 300 MHz and the second frequency is approximately 125 kHz or approximately 2.45 GHz.

6. An information providing system according to claim 1, wherein the wireless sheet is positioned on the article so that the physical quantity data is altered when an area for handling the article is contacted by a person.

7. An information providing system comprising:
a wireless sheet attached to an article;
an information notifying apparatus that sends a first request signal and a second request signal having a different frequency from the first request signal, the second request signal being sent based on a response signal sent from the wireless sheet in response to the first request signal; and
a database connected to the information notifying apparatus via a network, wherein,
the wireless sheet comprises a wireless measuring unit which, when receiving the request signal, generates and sends the response signal by using the request signal as an energy source, the response signal including identification data when the request signal is the second request signal and data of physical quantity measured in the wireless sheet when the request signal is the first request signal, the wireless measuring unit comprising:
an exciter that receives the request signal and generates a mechanical vibration;
a vibration medium on that a surface acoustic wave is generated by a mechanical vibration that is generated by the exciter, and on which an attribute of the surface acoustic wave changes due to a distortion of the vibration medium by a physical quantity; and
a transmitter that converts a surface acoustic wave generated on the vibration medium to an electrical signal and sends the electrical signal as the response signal;
the database stores the identification data and the article information in association with each other, and
the information notifying apparatus comprises:
a radio unit that exchanges the request and response signals with the wireless sheet and that transmits an initial request signal being a first request signal to the wireless sheet;
a notifying unit that extracts from the response signal received by the radio unit at least one of the identification data and the measured data of physical quantity, and
under the condition that the measured data is extracted and the extracted measured data indicates that the physical quantity is being applied, the radio unit transmits the second request, and under the condition that the identification information is extracted, the notifying unit reads from the database the article information stored in association with the identification data, and notifies the article information and the measured data of physical quantity; and a distance calculation unit that calculates a distance between the information notifying apparatus and the wireless sheet on the basis of the response signal, wherein the physical quantity is pressure.

8. The information providing system according to claim 7, wherein the distance calculation unit calculates a distance between the information notifying apparatus and the wireless sheet on the basis of a strength of the response signal.

9. An information providing system comprising:

a wireless sheet attached to an article; and an information notifying apparatus that sends a first request signal and a second request signal having a different frequency from the first request signal, the second request signal being sent based on a first response signal sent from the wireless sheet in response to the first request signal, wherein, the wireless sheet comprises:

an identification data transmitter which, when receiving the second request signal, sends a second response signal having identification data of the wireless sheet or the article; and a wireless measuring unit which, when receiving the first request signal, generates and sends the first response signal by using the first request signal as an energy source, the first response signal including identification data and data of physical quantity measured in the wireless sheet, the wireless measuring unit comprising:

an exciter that receives the first request signal and generates a mechanical vibration;

a vibration medium on which a surface acoustic wave is generated by a mechanical vibration that is generated by the exciter, and on which an attribute of the surface acoustic wave changes due to a distortion of the vibration medium by a physical quantity; and a transmitter that converts a surface acoustic wave generated on the vibration medium to an electrical signal and sends the electrical signal as the first response signal; and the information notifying apparatus comprises:

a radio unit that exchanges the first and second request signals and the first and second response signals with the wireless sheet and that transmits an initial request signal being a first request signal to the wireless sheet;

a storage unit which stores the identification data and the article information in association with each other;

a notifying unit that extracts from the first and second at least one of the response signals received by the radio unit the identification data and the measured data of physical quantity, and under the condition that the measured data is extracted and the extracted measured data indicates that the physical quantity is being applied, the radio unit transmits the second request to the wireless sheet, and under the condition that the identification information is extracted, the notifying unit reads the article information stored in association with the identification data in the storage unit, and notifies the article information and the measured data of physical quantity; and a distance calculation unit that calculates a distance between the information notifying apparatus and the wireless sheet on the basis of the response signal, wherein the physical quantity is pressure.

10. The information providing system according to claim 9, wherein the distance calculation unit calculates a distance between the information notifying apparatus and the wireless sheet on the basis of a strength of the response signal.

11. An information providing system comprising:

a wireless sheet attached to an article;

an information notifying apparatus that sends a first request signal and a second request signal having a different frequency from the first request signal, the second request signal being sent based on a first response signal sent from the wireless sheet in response to the first request signal; and a database connected to the information notifying apparatus via a network, wherein, the wireless sheet comprises:

an identification data transmitter which, when receiving the second request signal, sends a second response signal having identification data of the wireless sheet or the article; and a wireless measuring unit which, when receiving the first request signal, generates and sends the first response signal by using the first request signal as an energy source, the first response signal including identification data and data of physical quantity measured in the wireless sheet, the wireless measuring unit comprising:

an exciter that receives the first request signal and generates a mechanical vibration;

a vibration medium on which a surface acoustic wave is generated by a mechanical vibration that is generated by the exciter, and on which an attribute of the surface acoustic wave changes due to a distortion of the vibration medium by a physical quantity; and a transmitter that converts a surface acoustic wave generated on the vibration medium to an electrical signal and sends the electrical signal as the first response signal;

the database stores the identification data and the article information in association with each other, and the information notifying apparatus comprises:

a radio unit that exchanges the first and second request signals and the first and second response signals with the wireless sheet and that transmits the first request signal to the wireless sheet;

a notifying unit that extracts from the first and second response signals received by the radio unit the identification data and the measured data of physical quantity, and under the condition that the measured data is extracted and the extracted measured data indicates that the physical quantity is being applied, the radio unit transmits the second request to the wireless sheet, and under the condition that the identification information is extracted, the notifying unit reads from the database the article information stored in association with the identification data, and notifies the article information and the measured data of physical quantity; and a distance calculation unit that calculates a distance between the information notifying apparatus and the wireless sheet on the basis of the response signal, wherein the physical quantity is pressure.

12. The information providing system according to claim 11, wherein the distance calculation unit calculates a distance between the information notifying apparatus and the wireless sheet on the basis of a strength of the response signal.

13. An image forming apparatus comprising:
an image forming unit which generates a toner image on the basis of image data, transfers and fixes the toner image on a sheet, and thereby forms an image on the sheet; and
an information providing system, the information providing system comprising:
  a wireless sheet attached to a component of the image forming apparatus; and
  an information notifying apparatus that sends a first request signal and a second request signal having a different frequency from the first request signal, the second request signal being sent based on a response signal sent from the wireless sheet in response to the first request signal, wherein,
  the wireless sheet comprises a wireless measuring unit which, when receiving the request signal, generates and sends the response signal by using the request signal as an energy source, the response signal including identification data when the request signal is the second request signal and data of physical quantity measured in the wireless sheet when the request signal is the first request signal, the wireless measuring unit comprising:
    an exciter that receives the request signal and generates a mechanical vibration;
    a vibration medium on which a surface acoustic wave is generated by a mechanical vibration that is generated by the exciter, and on which an attribute of the surface acoustic wave changes due to a distortion of the vibration medium by a physical quantity; and
    a transmitter that converts a surface acoustic wave generated on the vibration medium to an electrical signal and sends the electrical signal as the response signal; and
  the information notifying apparatus comprising:
    a radio unit that exchanges the request and response signals with the wireless sheet and that transmits the first request signal to the wireless sheet;
    a storage unit that stores the identification data and the component information in association with each other;
    a notifying unit that extracts from the response signal received by the radio unit at least one of the identification data and the measured data of physical quantity and
      under the condition that the measured data is extracted and the extracted measured data indicates that the physical quantity is being applied, the radio unit transmits the second request to the wireless sheet, and
      under the condition that the identification information is extracted, the notifying unit reads the article information stored in association with the identification data in the storage unit, and notifies the component information and the measured data of physical quantity; and
    a distance calculation unit that calculates a distance between the information notifying apparatus and the wireless sheet on the basis of the response signal, wherein
  the physical quantity is pressure.

14. The image forming apparatus according to claim 13, wherein the distance calculation unit calculates a distance between the information notifying apparatus and the wireless sheet on the basis of a strength of the response signal.

* * * * *